US012197222B2

(12) United States Patent
Rands et al.

(10) Patent No.: US 12,197,222 B2
(45) Date of Patent: Jan. 14, 2025

(54) AVOIDING COLLISIONS WITH AUTONOMOUS OFF-ROAD VEHICLES

(71) Applicant: Trimble Inc., Sunnyvale, CA (US)

(72) Inventors: Joshua Rands, Westminster, CO (US); Riley Kenyon, Westminster, CO (US); Justin Creaby, Westminster, CO (US)

(73) Assignee: Trimble Inc., Westminster, CO (US)

( * ) Notice: Subject to any disclaimer, the term of this patent is extended or adjusted under 35 U.S.C. 154(b) by 278 days.

(21) Appl. No.: 17/878,220

(22) Filed: Aug. 1, 2022

(65) Prior Publication Data
US 2024/0036579 A1 Feb. 1, 2024

(51) Int. Cl.
G05D 1/00 (2024.01)
A01B 69/00 (2006.01)
A01B 69/04 (2006.01)

(52) U.S. Cl.
CPC ......... *G05D 1/0214* (2013.01); *A01B 69/001* (2013.01); *A01B 69/008* (2013.01)

(58) Field of Classification Search
CPC .... G05D 1/0214; A01B 69/001; A01B 69/008
See application file for complete search history.

(56) References Cited

U.S. PATENT DOCUMENTS

| 11,663,917 | B2* | 5/2023 | Pflug | B60W 30/10 |
| | | | | 701/41 |
| 11,738,772 | B1* | 8/2023 | Beller | B60W 30/09 |
| | | | | 701/26 |
| 2012/0046820 | A1 | 2/2012 | Allard et al. | |
| 2012/0218093 | A1* | 8/2012 | Yoshizawa | G08G 1/166 |
| | | | | 340/435 |
| 2013/0339098 | A1* | 12/2013 | Looman | G06Q 10/0637 |
| | | | | 705/7.36 |
| 2018/0017398 | A1* | 1/2018 | Mcnew | G01C 21/3453 |
| 2018/0244275 | A1* | 8/2018 | Bremkens | B60W 30/18163 |
| 2019/0196480 | A1* | 6/2019 | Taylor | G05D 1/0223 |
| 2019/0235499 | A1* | 8/2019 | Kazemi | G01S 7/417 |
| 2020/0324763 | A1* | 10/2020 | Switkes | G08G 1/161 |
| 2020/0365030 | A1* | 11/2020 | Pflug | G08G 1/163 |
| 2021/0094539 | A1* | 4/2021 | Beller | G05D 1/0214 |
| 2021/0107522 | A1* | 4/2021 | Goto | B60W 30/0956 |
| 2021/0122373 | A1 | 4/2021 | Dax | |
| 2021/0318697 | A1 | 10/2021 | Tehrani et al. | |
| 2021/0347362 | A1* | 11/2021 | Bowyer | B60W 60/00274 |
| 2023/0059112 | A1* | 2/2023 | Ito | G01C 21/3469 |
| 2023/0132512 | A1* | 5/2023 | Clawson | B60W 60/0027 |
| | | | | 701/26 |

(Continued)

OTHER PUBLICATIONS

Extended European Search Report for Application No. 23185265.8-1205, mailed Dec. 15, 2023, 9 pages.

*Primary Examiner* — Naeem Taslim Alam

(74) *Attorney, Agent, or Firm* — Kilpatrick Townsend & Stockton LLP

(57) ABSTRACT

Disclosed are techniques for avoiding collisions with obstacles by a vehicle, in particular an off-road vehicle. Objects are detected with sensors in a calculated projected path zone of the vehicle footprint based on a vehicle trajectory. Possible path zones on either side of the projected path zone where the vehicle could potentially go with a change in trajectory are determined. The vehicle is slowed down or stopped for objects in the projected path and is slowed less for objects within the possible path zones.

20 Claims, 10 Drawing Sheets

(56) References Cited

U.S. PATENT DOCUMENTS

| 2023/0282113 | A1* | 9/2023 | Sharma | B60W 30/143 |
| | | | | 701/36 |
| 2023/0347880 | A1* | 11/2023 | Clawson | G06V 20/58 |
| 2024/0034308 | A1* | 2/2024 | Agrawal | B60W 50/14 |

* cited by examiner

AVOIDING COLLISIONS WITH AUTONOMOUS OFF-ROAD VEHICLES

BACKGROUND

The present invention relates to autonomous navigation, and in particular such navigation for farm equipment.

There have been many advances in autonomous navigation for vehicles that travel on roads. In particular, systems have been developed to recognize where the road and lane lines are, to recognize stop lights and other traffic signals, etc. However, off-road vehicles, such as farm equipment, travel in fields without roads or traffic signals, and upon ground that may be uneven and has vegetation directly in front of the equipment, such as crops to be harvested by the equipment. Accordingly, autonomous navigation for farm equipment presents a different set of challenges. In particular, it is a challenge to identify obstacles in the path of the equipment since the path is not a recognizable road.

It would be desirable to have a collision avoidance system that handles the unique challenges of off-road vehicles such as farm equipment. As such, new systems, methods, and other techniques are needed to address these and other issues.

Unless otherwise indicated herein, the materials described in this section of the Specification are not prior art to the claims in this application and are not admitted to be prior art by inclusion in this section.

SUMMARY

In embodiments, a method and apparatus are provided for avoiding collisions with obstacles by a vehicle. A footprint for the vehicle is recorded, along with stopping times as a function of speed. A current speed and projected (e.g., planned) trajectory of the vehicle is determined. A projected path zone corresponding to the current vehicle trajectory and the vehicle footprint is determined. Possible path zones on either side of the projected path zone where the vehicle could potentially go with a change in trajectory are determined. Objects are detected in the projected and possible path zones. The vehicle is slowed down or stopped if a projected path object is within a stopping distance plus a projected path buffer distance based on the current speed and a corresponding stopping time with the projected vehicle trajectory. The vehicle is slowed down if a possible path object is within a stopping distance plus a possible path buffer distance based on the current speed and a corresponding stopping time of the vehicle, wherein the possible path buffer distance is smaller than the projected path buffer distance.

An advantage of embodiments of the invention is that a vehicle need not stop or slow down for an obstacle directly in its current path, if a turn that will avoid the obstacle is planned before the vehicle gets dangerously close to the obstacle. This is an advantage for farm equipment, which often makes sharp turns and the ends of a field, and objects sufficiently beyond the edge of the field will not present a problem. Additionally, this allows the vehicle to slow down or stop for obstacles not currently in front of the vehicle, but in the planned path during or after the turn.

In embodiments, the trajectory is a curved trajectory. In embodiments, a weighted trajectory of a vehicle is determined based on a current trajectory and a pre-planned trajectory. A preplanned path for the vehicle is generated ahead of time and recorded, or is generated in real time. The current trajectory is determined. The weighted trajectory is calculated based on the preplanned path and the current trajectory.

In embodiments, the weighted trajectory is determined by assigning weights to positions of the preplanned path and positions of the current trajectory. The positions closer to the vehicle on the current trajectory have a higher weight than preplanned path positions at the same distance from the vehicle, and positions farther from the vehicle on the preplanned path positions have a higher weight than current trajectory positions at the same distance from the vehicle. The weighted positions for the preplanned path and current trajectory are combined to provide a weighted trajectory.

In embodiments, obstacles are determined not to present a likely collision if the vehicle will pass over or under the obstacle. A three-dimensional geometry of the vehicle is recorded. The height of, or clearance under, an object is determined. A comparison of the height of, or clearance under, the object to the three-dimensional geometry of the vehicle plus a clearance buffer is performed. The slowing of the vehicle is limited if the comparing shows that the vehicle will pass over or under the object without a collision.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION

Figure 1:
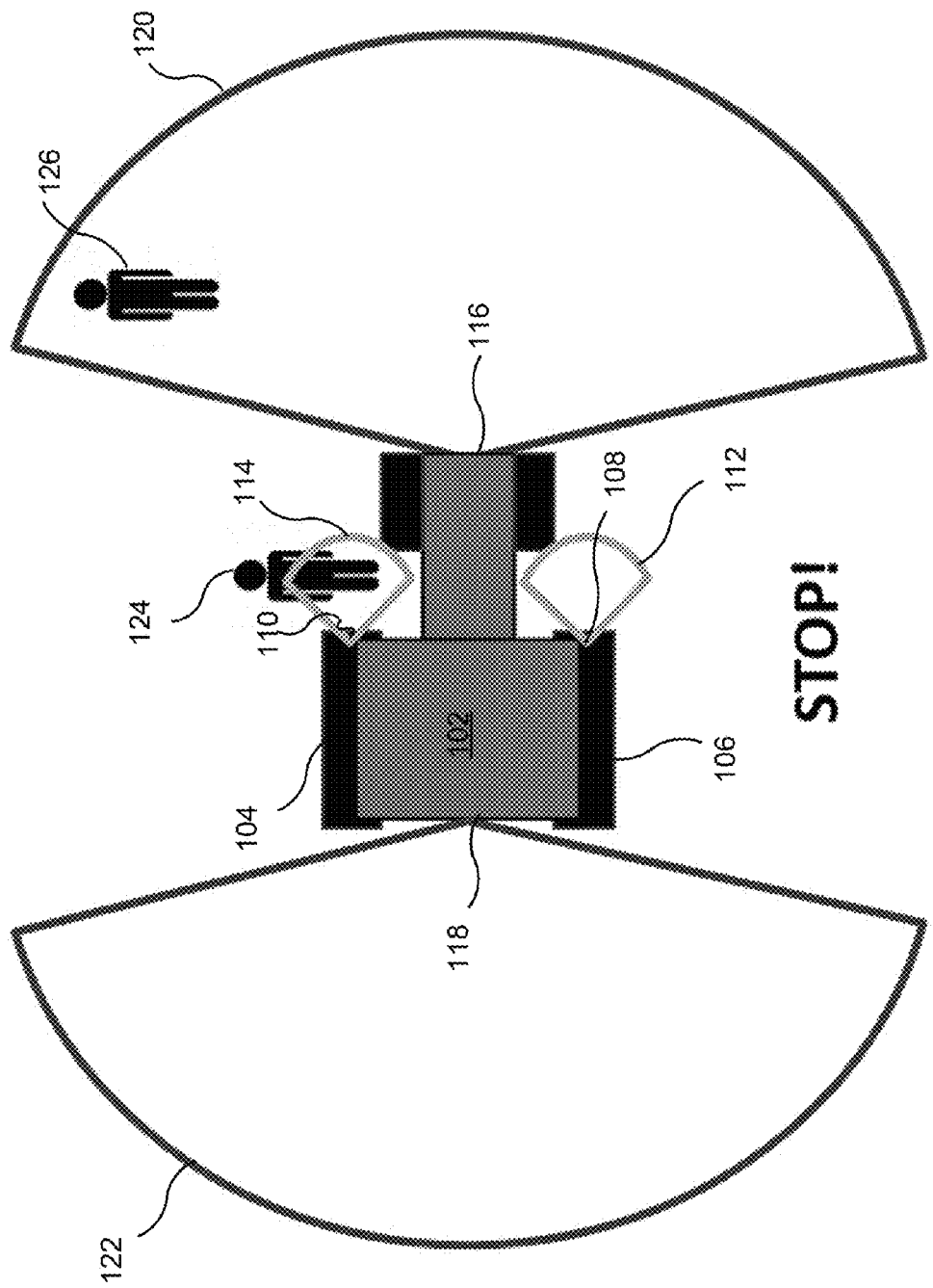
FIG. 1 is a diagram of sensor zones for an off-road vehicle, according to embodiments.
Figure 2:
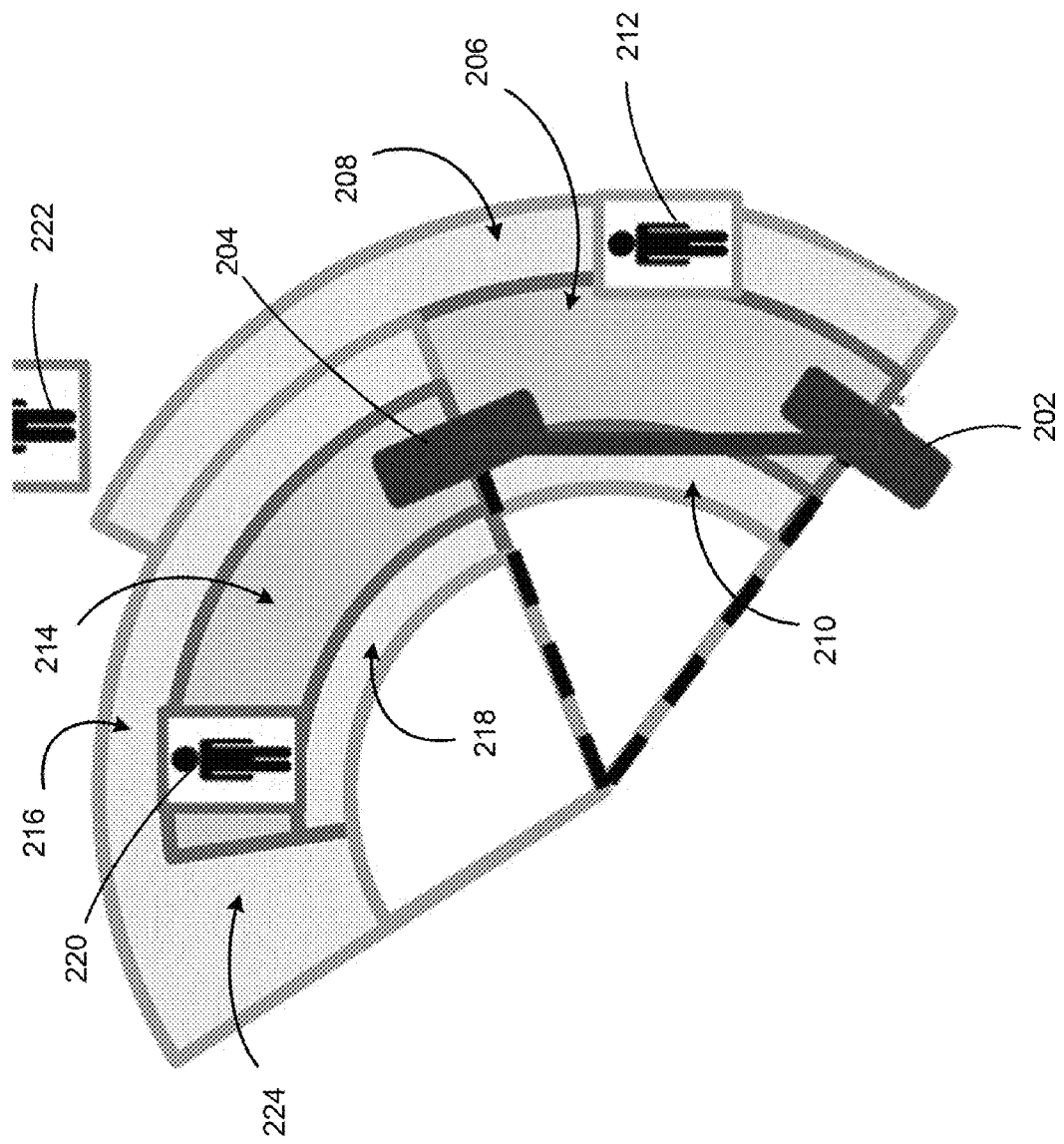
FIG. 2 is a diagram of projected front and rear axles, and possible path zones at different positions for an off-road vehicle, according to embodiments.
Figures 3A, 3B:
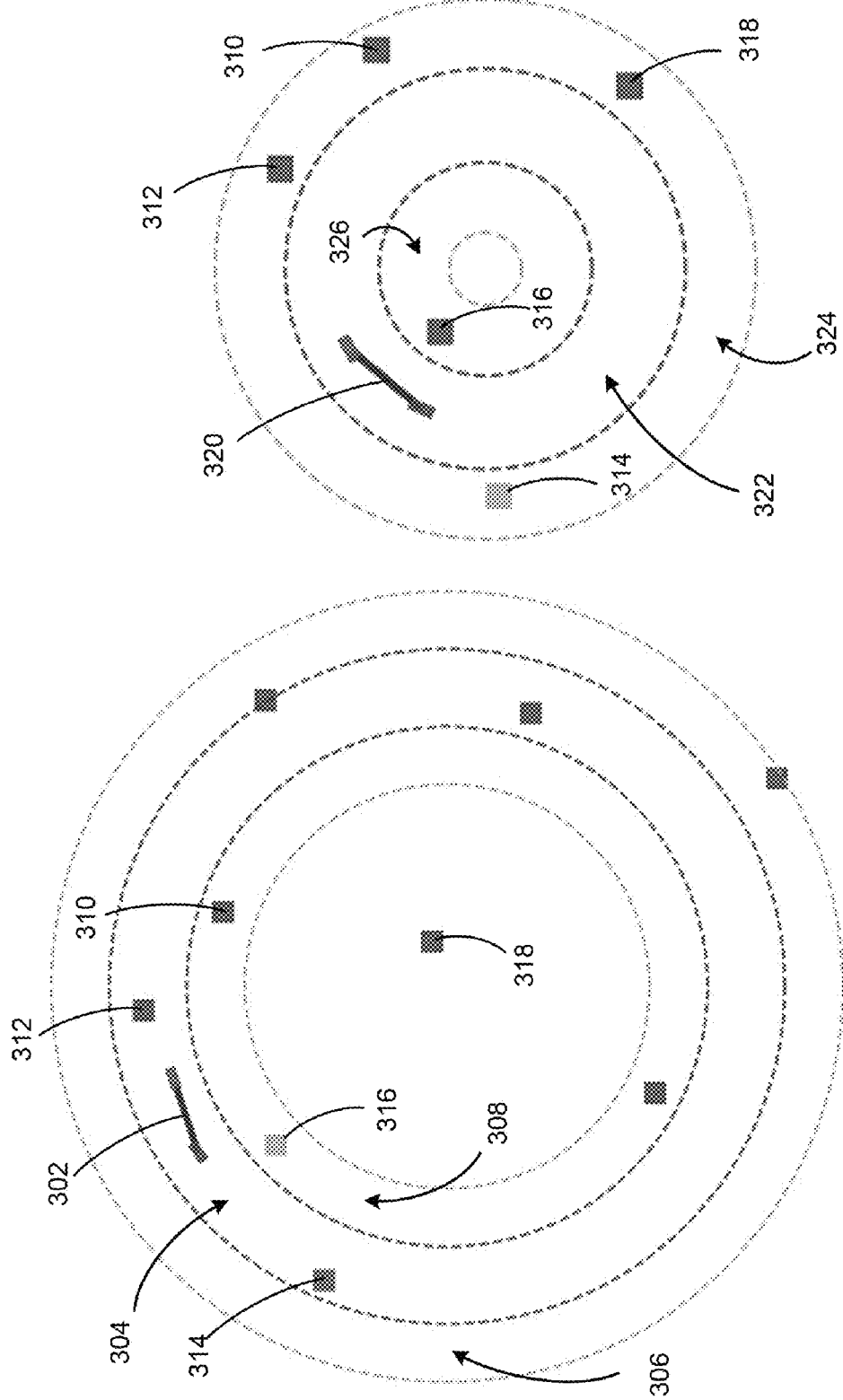
FIGS. 3A and 3B are diagrams of projected and possible path detection zones at different positions for an off-road vehicle, according to embodiments.
Figure 4:
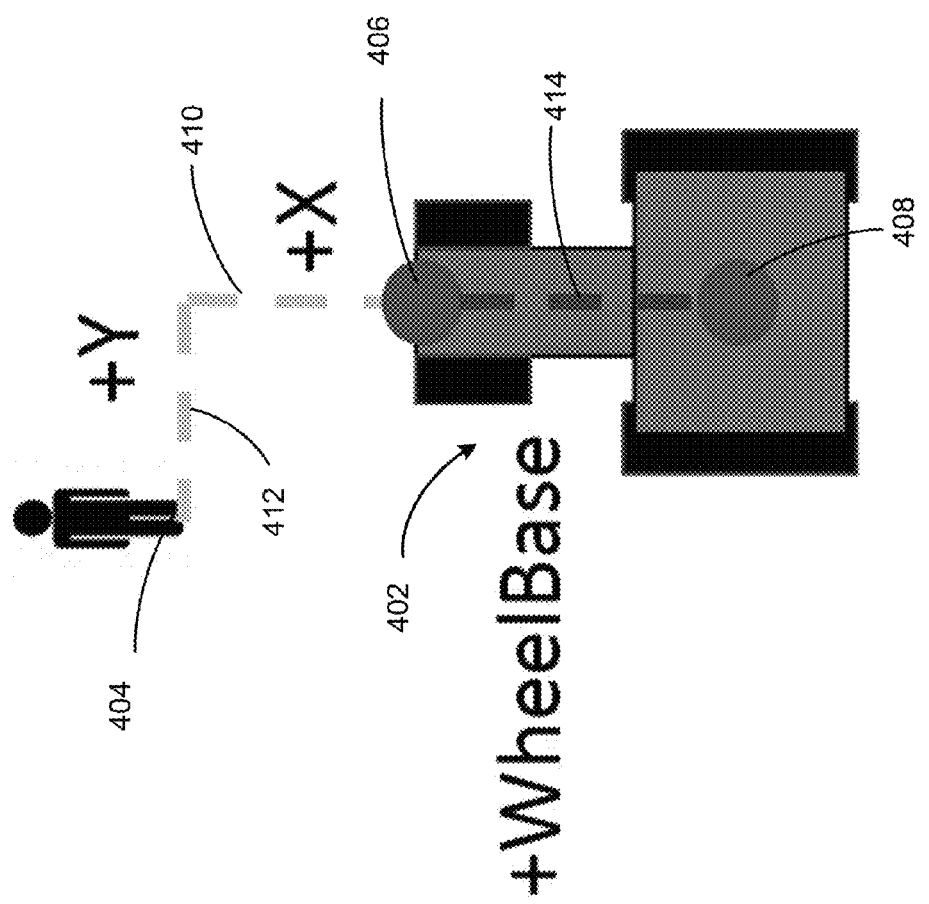
FIG. 4 is a diagram of potential obstacle X, Y position relative to an off-road vehicle, according to embodiments.
Figure 5:
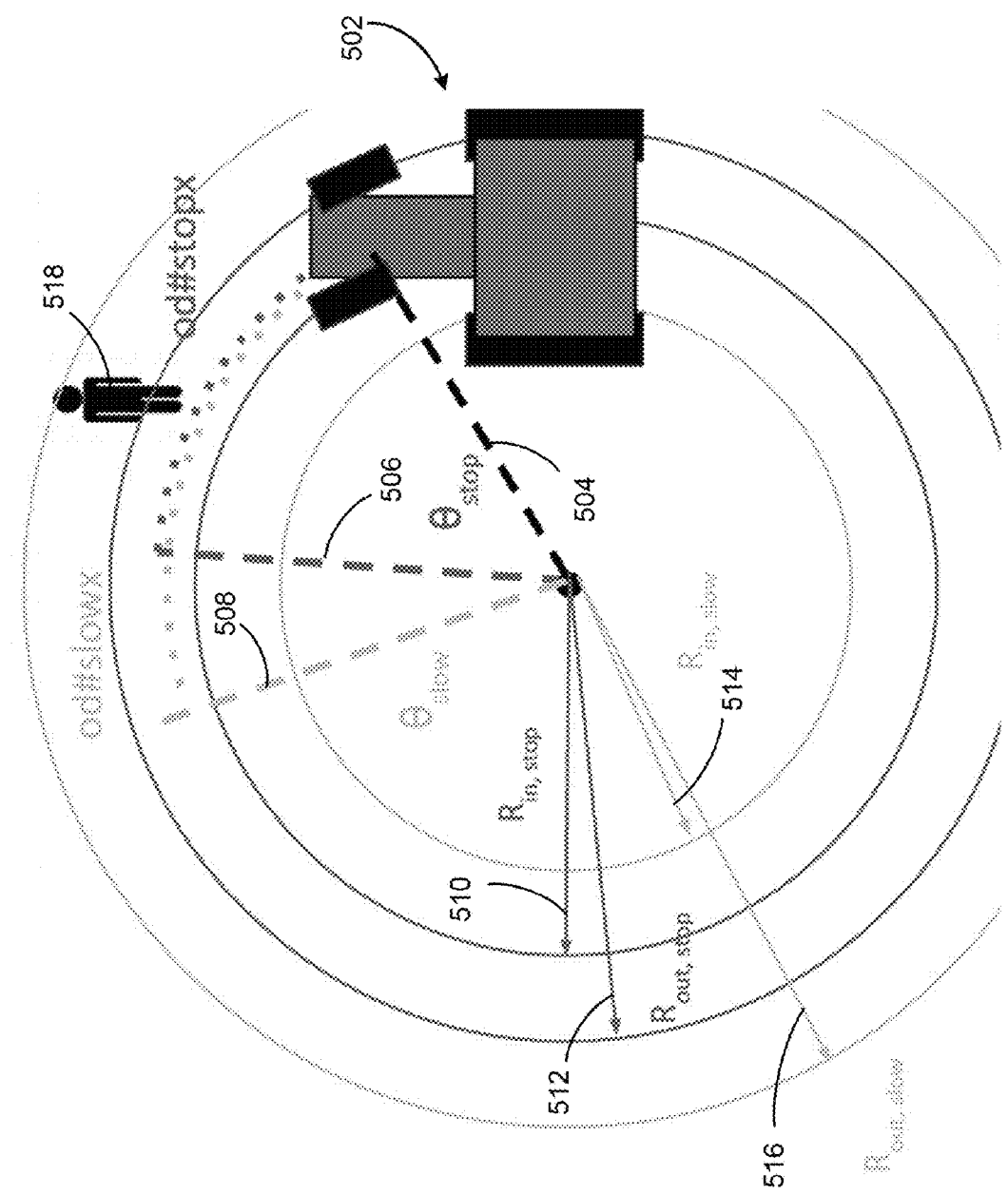
FIG. 5 is a diagram of projected and possible path detection zones and corresponding angles, according to embodiments.
Figure 6:
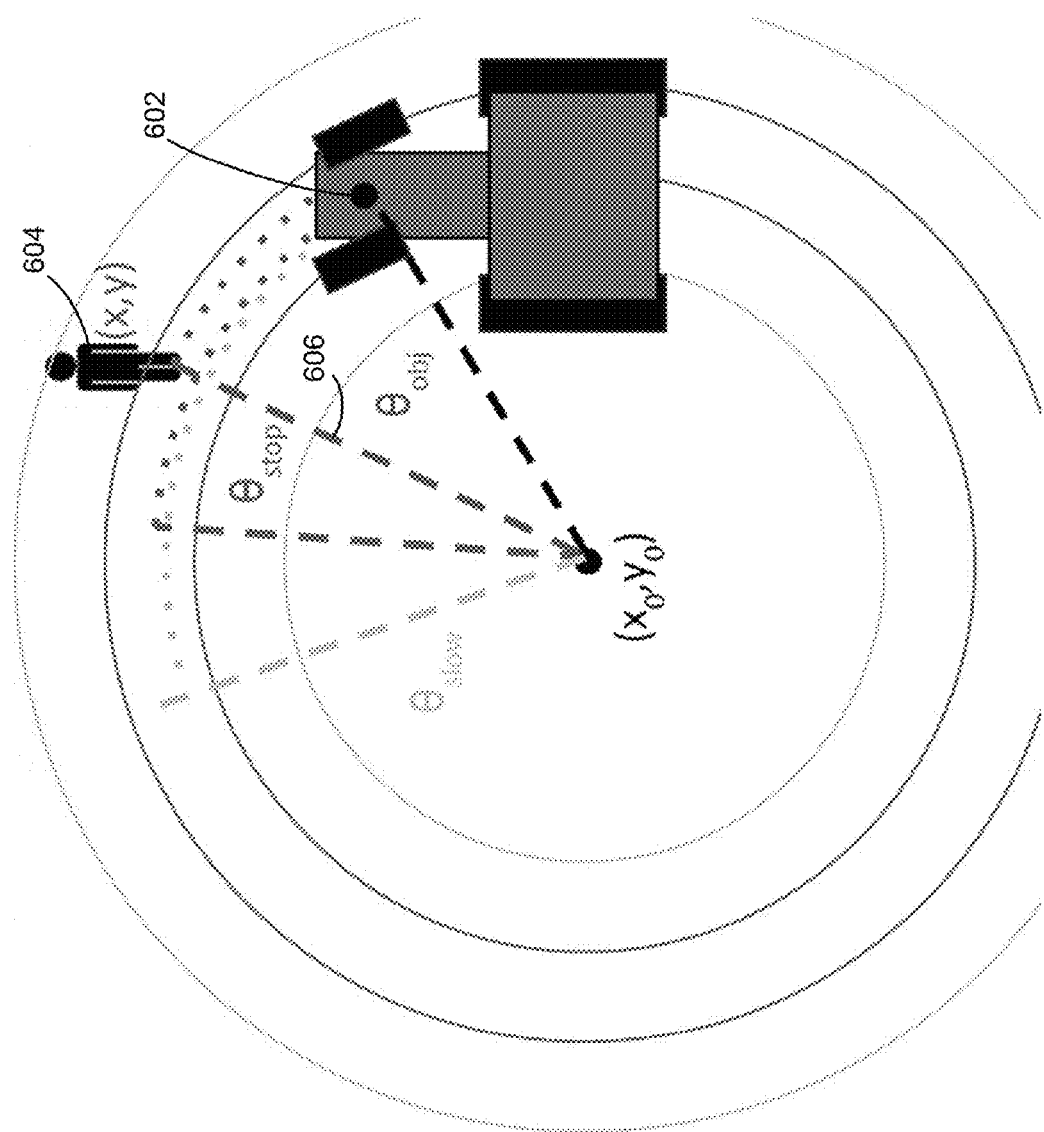
FIG. 6 is a diagram illustrating the conversion of the X, Y position of a potential obstacle to an angle and radius of projected and possible path detection zones, according to embodiments.
Figure 7:
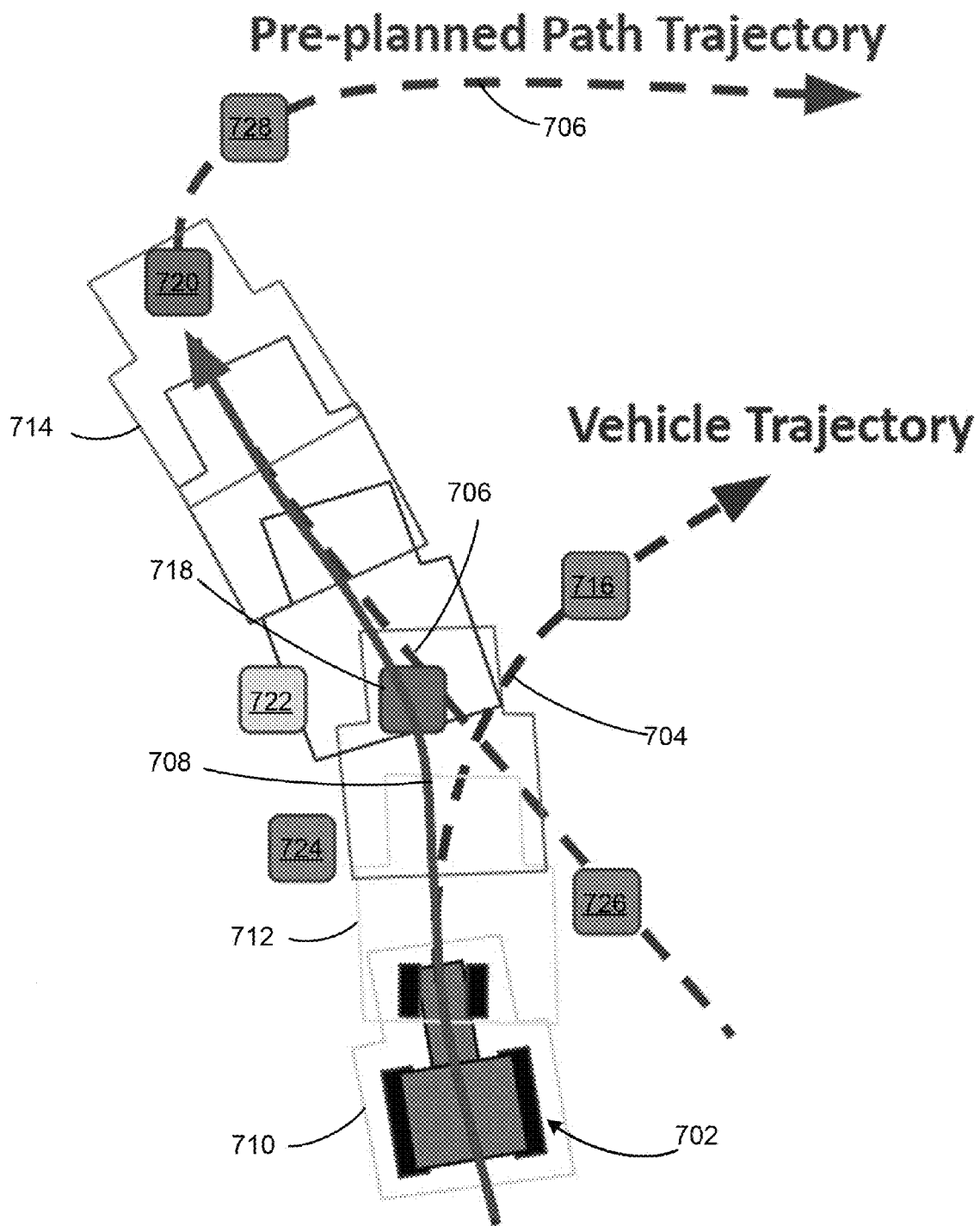
FIG. 7 is a diagram of a weighted trajectory of a pre-planned path and current trajectory of a vehicle, according to embodiments.

Disclosed are techniques for avoiding collisions with obstacles by a vehicle, in particular an off-road vehicle. FIG. 1 illustrates sensors for detecting objects. Objects are detected in a calculated projected path zone of the vehicle footprint based on a vehicle trajectory as illustrated in FIG. 2. Possible path zones on either side of the projected path zone where the vehicle could potentially go with a change in trajectory are determined, and constantly updated, as shown in FIGS. 3A-B. The conversion of object x, y coordinates to polar coordinates (an angle and radius) for comparison to the vehicle trajectory is illustrated in FIGS. 4-6. FIG. 7 shows the weighting of the actual versus planned vehicle trajectory for estimated object collisions. The vehicle is slowed down or stopped for objects in the projected path and is slowed less for objects within the possible path zones.

Location of Sensors on Vehicles

FIG. 1 is a diagram of sensor zones for an off-road vehicle, according to embodiments. An off-road vehicle 102 (e.g., a tractor) has side wheels 104 and 106 at its widest portion. Sensors 108 and 110 are mounted above the side wheels, with fields of view (FOV) 112 and 114. A front sensor 116 is mounted near the front of vehicle 102, and a rear sensor 118 is mounted near the rear. These have FOVs 120 and 122, respectively. An obstacle, such as a person 124, in the FOV of the side sensors is too close, and should cause the vehicle to immediately stop. However, an obstacle, such as person 126, that is in the FOV 126 of front sensor 116 is not directly in front of vehicle 116, so vehicle 102 need not stop. However, the location of person 126 is monitored, in case the person is moving into the path of the vehicle. Also, the speed and direction of the vehicle is monitored, in case the vehicle starts turning towards person 126. Based on such monitoring, the vehicle is slowed an amount that corresponds to the possibility the person could be hit, allowing sufficient time to stop if the person continues to move across the path of the vehicle, or if the vehicle turns toward the person.

The sensors can be one or more of a camera, LiDAR, RADAR, or any other sensor. Off-road vehicles, and in particular farm equipment, tend to have wider and narrow portions as shown in FIG. 1, and thus sensor placement over the widest portion provides additional benefits. Alternately, or in addition, the width of the vehicle with respect to a front/rear or other sensor is recorded, and used to indicate whether objects in the FOV of the vehicle are in the path of wheels 104, 106. Off-road and farm equipment are also subject to more visibility issues than cars on a road, due to dust, crops being harvested, etc. Additionally, the terrain is often uneven FIG. 2 is a diagram of projected and possible path zones at different positions for an off-road vehicle, according to embodiments. A "bicycle" model is used, with the path of the front and rear wheels being projected along the current curvature. This provides a more accurate path than simply the front wheels for vehicles that steer with both the front and rear wheels. A vehicle has a first position 202, and a few moments later has a second position 204. At position 202, a projected path zone 206 indicates where the vehicle will go, based on its currently projected trajectory. In this example, the vehicle is turning to the left. Projected path zone 206 includes a buffer to allow for slight variations, and to avoid coming too close to obstacles. The buffer could be a foot, a yard, or another distance deemed appropriate. For example, the variation off a desired path for that type of vehicle can be recorded for many vehicles, and variations based on type of terrain can also be recorded. Based on this data, a user can input the type of terrain, and the type of vehicle can be noted and compared with the experience data at a cloud computer. An appropriate buffer can then be calculated and downloaded to the vehicle.

Possible path zones 208 and 210 are determined adjacent to projected path zone 206. The possible path zones are areas the vehicle could go due to various factors, such as turning the vehicle due to an update in the planned path, slippage due to the terrain, wobbliness in the vehicle, etc. The significance of the possible path zone is that an obstacle in such a zone, such as a person 212, is unlikely to collide with the vehicle. However, if the vehicle makes an unexpected turn, etc., it could collide. Thus, the vehicle can be slowed so that the person 212 is beyond the stopping distance from the vehicle. This ensures that if the vehicle direction changes so that person 212 is in a projected path zone, the vehicle has time to stop, or time to turn. Alternately, the vehicle is not slowed to be within a stopping distance, but rather is slowed to insure it would have time to turn away if the vehicle unexpectedly turned toward the obstacle.

At vehicle position 204, a period of time after position 202, the vehicle has changed its trajectory. In this case, the turn radius has sharpened. Thus, a new projected path zone 214 and possible path zones 216 and 218 are calculated. In these new calculated zones, a person 220 is an obstacle in the projected path zone 214, and accordingly the vehicle will stop, or at least slow down (allowing the person time to move), or will change direction. Another person 222 is within the FOV of the vehicles sensors, but outside the projected and possible path zones, and thus is ignored as being safely outside the possible collision zones. An area 224 beyond projected path zone 214 is treated as a possible path zone, since it is far enough out that the vehicle may change direction before then. To insure no possible collision, it is treated as a slow zone, to insure that the current speed of the vehicle is slowed sufficiently so that it is beyond the stopping distance of the vehicle at its current speed.

FIGS. 3A and 3B are diagrams of projected and possible path detection zones at different positions for an off-road vehicle, according to embodiments. These figures show the zones extended to a full circle for a turning vehicle. In FIG. 3A, when the vehicle is at a position 302, the inner ring is the projected path zone 304. The adjacent rings are possible path zones 306 and 308. Objects 310 and 312 are behind the vehicle position, and are thus ignored. The objects 310 and 312 are ignored because the vehicle is moving forwards. Object 314 is directly in the vehicles path, and thus the vehicle will slow down, stop or turn as appropriate. Object 316 is only in a possible path, and thus the vehicle will only slow down or turn as needed. Object 318 is outside both the projected and possible paths, and is thus ignored.

FIG. 3B shows the vehicle having advanced to a new position 320, making a tighter turn than indicated by projected path 304 of FIG. 3A. New projected path 322 is a tighter circles, as are new possible paths 324 and 326. Object 314, which previously was directly in the projected path, is now only in a possible path 324, since the vehicle has turned more inward. Thus, the vehicle no longer needs to stop for object 314, and may not need to slow, depending on the vehicle's speed. If the vehicle speed was slowed down a lot, it may be able to speed up at this point.

Object 316, which was in possible path 308, is still in new possible path 326. However, the vehicle is passing object 316, and could not turn enough to hit it at the new position. Thus, object 316 can be ignored at this point. The other objects 310, 312 and 318 remain either behind the vehicle or too far away to be of concern.

Although rings are shown for the zones, other shapes could be used. The zones could widen farther from the vehicle to take into account more turning in the projected zone, for example. The shapes can also vary depending upon the trajectory of the vehicle and its planned route. For example, farm equipment may be programmed to harvest, plow, etc. a series of parallel paths, turning 180 degrees at each end. Thus, for example, a straight, rectangular zone could be used for most of the path, switching near the turning point to a ring or curved zone, possibly widening further from the vehicle.

FIG. 4 is a diagram of potential obstacle X, Y position relative to an off-road vehicle, according to embodiments. FIG. 4 provides a visualization of how object positions are calculated from a different reference frame when moving forwards and reverse. Typically the obstacles are reported in the reference frame of the vehicle (center of rear axle). The reference point needed for obstacle detection changes depending if the vehicle is moving forwards or reverse. Moving forwards the distance to the obstacle is calculated from the front of the vehicle, while in reverse it is calculated from the rear of the vehicle. The dots 406 and 406 show this difference while moving forwards. This figure illustrates the position determination of an obstacle 404 relative to a vehicle 402. In one embodiment, the vehicle distance and direction sensor (RADAR, LiDAR, camera, etc.) is at a rear position 408 of the vehicle, such as the cab of a tractor. The location of obstacle 404 relative to vehicle 402 in the Y direction is indicated by dotted line 412. The distance from sensor location 408 in the X direction is the sum of dotted line 410 plus the length of the vehicle in front of sensor position 414, indicated by dotted line 414, which roughly corresponds to the wheelbase. Thus, for collision purposes, the distance of dotted line 414 must be subtracted from the total X direction to determine how far obstacle 404 is from the front of the vehicle.

When vehicle 402 is in reverse, the distance from location 408 can be used directly, less any distance between sensor position 408 and the back of the vehicle. In some embodiments, the footprint and turning characteristics of the vehicle are stored in memory, along with the location of the sensor or sensors on the vehicle. This can be used to vary the projected path zone depending on the current and/or planned trajectory of the vehicle. For example, for a left turn, the back left wheel may define the leftmost path line of the vehicle, while the front right tire may define the rightmost path line. The right rear tire could possibly turn inside the turning radius of the right front tire. This depends on the relative widths of the vehicle at the front and rear tires. Alternately, the rear tire (or a back, outer edge) could be on a towed piece of equipment, such as trailer or a plow.

In some embodiments, multiple sensors could be used, such as shown in FIG. 1. The sensor information can be combined in multiple ways. Each sensor could define its own zones, with the computer using the most conservative obstacle collision information from all the sensors to determine if the vehicle must slow or stop. Alternately, the information could be averaged, to provide an averaged position of each object. Other combinations are also possible.

FIG. 5 is a diagram of projected and possible path detection zones and corresponding angles, according to embodiments. The arc lengths of the projected and possible path zones are represented in polar coordinates by the angle and radius for the inner and outer arcs. For a vehicle 502 at the shown position, line 504 represents the radius of the turning radius of the front of the vehicle. A radial line 506 represents the end of the projected path zone. Objects closer than this may require the vehicle to stop. The angle between the two is $\Theta_{stop}$. A radial line 508 represents the end of a possible path zone, bounded by lines 504 and 508, forming an angle $\Theta_{slow}$. The projected path zone is the area between the arcs shown by inner radius 510 and outer radius 512. The width of the projected path zone is defined by the offset between the inner and outer radius. The inner possible path zone is defined by arcs with inner radius 514 and outer radius 510. The outer possible path zone is defined by arcs with inner radius 512 and outer radius 516.

FIG. 6 is a diagram illustrating the conversion of the X, Y position of a potential obstacle to polar coordinates (an angle and radius) of projected and possible path detection zones, according to embodiments. The sensor or sensors 602 will detect the X, Y position of an obstacle 604 with respect to the sensor at its X, Y position. The sensor X, Y position with respect to the center of the instantaneous center of rotation of the current trajectory is calculated, with the center being at X, Y position Xo, Yo. To map this onto the zones represented as areas between arcs, the relative X, Y position of the obstacle 604 is converted into an angle Oobj and radius 606.

Weighted Trajectory

FIG. 7 is a diagram of a weighted trajectory of a pre-planned path and current trajectory of a vehicle, according to embodiments. A weighted trajectory 708 of a vehicle 702 is determined based on a current curved trajectory 704 and a pre-planned curved trajectory 706. A preplanned path for the vehicle is generated ahead of time and recorded or is generated in real time, such as by setting forth a pattern for harvesting a crop. The path can be updated in real time based on the past path of the vehicle, which may have varied somewhat from the pre-planned path. The vehicle may get off the pre-planned path trajectory for a number of reasons. The vehicle may slide on mud, it may bounce to the side due to a rock, it may purposefully turn to avoid an object, etc. The current trajectory 704 is determined, and a weighted trajectory is calculated based on a combination of the preplanned path and the current trajectory.

In embodiments, the weighted trajectory is determined by assigning weights to positions of the preplanned path and positions of the current trajectory. The positions closer to the vehicle on the current trajectory have a higher weight than preplanned path positions at the same distance from the vehicle, and positions farther from the vehicle on the preplanned path positions have a higher weight than current trajectory positions at the same distance from the vehicle. This is because the vehicle simply cannot change its current trajectory very fast, and is programmed to try to stay on the pre-planned path, and thus will turn to return to the pre-planned path. The amount of the weighting is determined by taking into account the current speed of the vehicle and its maximum turning radius. At high speed it is not desirable to try to turn sharply to return to the pre-planned path, and thus the weighting is adjusted accordingly. The weighted positions for the preplanned path and current trajectory are combined to provide a weighted trajectory.

An outline 710 represents the footprint of the vehicle 702, plus a buffer zone. FIG. 7 shows the future positions of the vehicle along the weighted trajectory, such as outlines 712 and 714. The likelihood of collisions with obstacles is then determined based on the weighted trajectory. An object 716, which is directly in the current trajectory path, is ignored as being outside both a projected and possible trajectory, both calculated as described above. An obstacle 718, which is outside the current trajectory 704, is directly in the path of the weighted trajectory, and is close, thus it is in the projected path and the vehicle will stop or slow. Similarly, obstacle 720 is directly in the weighted trajectory, and thus, depending on the distance, may be in the projected path zone. An obstacle 722 is not directly in the weighted path, but is close, and thus is in a possible path, which may require the vehicle to slow, depending on its speed. Obstacles 724 and 726 are outside the projected and possible paths, and thus can be ignored. Obstacle 728 is on the pre-planned path trajectory, but is sufficient distant that it is not yet in a projected or possible path yet, and thus no action need be taken by the vehicle.

3D Obstacle Detection

Figure 8:
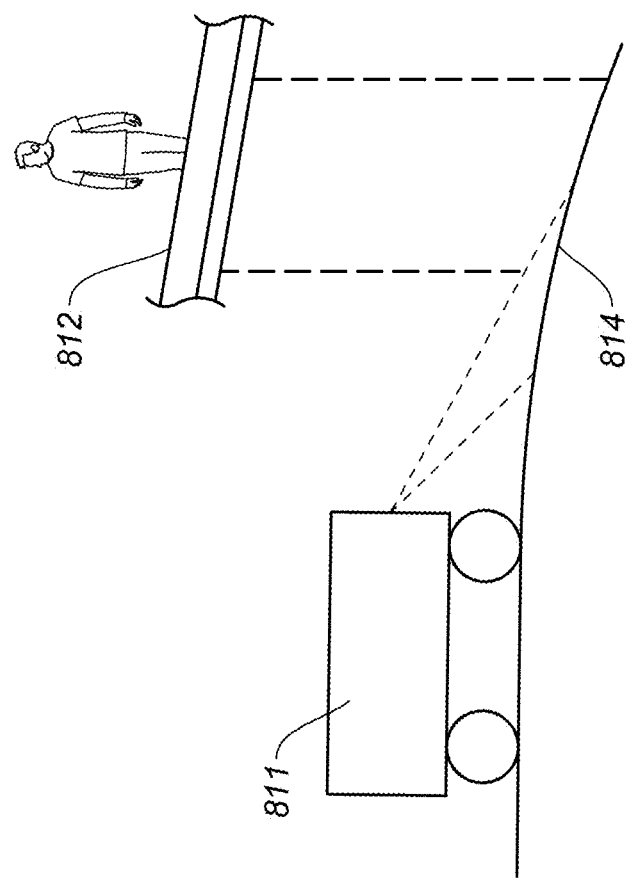
FIG. 8 is a diagram of obstacle clearance on uneven terrain, according to embodiments.
Figure 8:
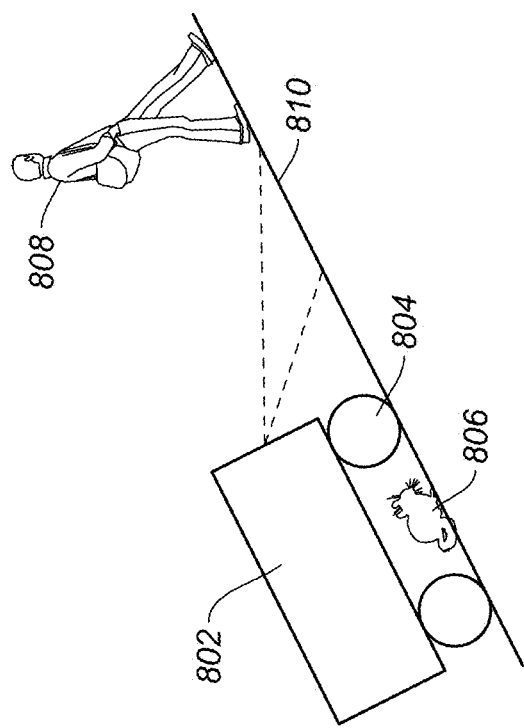

FIG. 8 is a diagram of obstacle clearance on uneven terrain, according to embodiments. A vehicle 802 with wheels 804 is on an upward slope. The vehicle computer knows the clearance underneath the vehicle, and knows the clearance between the tires. Thus, the vehicle could potentially pass over small obstacles, such as a rock or a small animal 806, but would not pass over a larger object, such as a person 808. This is particularly important for farm equipment, where, for example, a sprayer is intended to pass over crops it is spraying. An object that is small enough, and will not impact any of the wheels, can be passed over. A small animal that is moving may move into the path of the wheels, and thus the vehicle can slow until the animal moves, just as a driver of a car would for a squirrel in the road. A three dimensional perception system is implemented in software, using stored information with a parameterization of the vehicle in 3 dimensions. Comparisons are done to determine if an object will intersect with the vehicle body.

In embodiments, the vehicle can use image recognition to recognize plants to be harvested, or tall weeds that won't damage the vehicle, and can pass over those even if they will contact the vehicle. The image recognition can be combined with motion detection and depth detection (from sensors at different positions, for example) to confirm that the detected object matches the characteristics of the image recognition match. For example, corn stalks would be tall and thin, with some thicker portions for the corn.

The sensors also provide data to the perception system regarding a slope 810 that the object is on. An object that appears too tall may not be so after taking into account the increased height of the bottom of the vehicle as it climbs the slope.

A vehicle 811 is shown on terrain with a downslope 814 that is increasing in downward angle. The vehicle can determine whether it will pass under a bridge 812, taking into account the downslope 814 and the parameterization of the vehicle in 3 dimensions. Similarly, the vehicle can be slowed down as it approaches the base of a hill since the perception system would detect an obstacle(s) at the bottom of the steep hill (the ground plane), but the control system knows it is on a slope so will reduce speed until the slope levels out.

Other Embodiments

In embodiments, one or more of the detected objects may be moving, such as a person or animal. By comparing the location of the object at different times, the movement of an object can be detected. The trajectory of the moving object is then determined, and is updated for any changes. The system then calculates a projected future location of the moving object when the vehicle will be closer to the object, or when the vehicle would collide with the object if the object wasn't moving. The system can then determine whether the projected future location is within the projected or possible path zone. Often, a human or animal will move away from the path of the vehicle, and thus the movement information can prevent the vehicle from having to stop or slow down, or slow down as much, as it would if the object were stationary. If the object is moving toward the vehicle, the vehicle will be adjusted to slow down faster than if the object remained stationary.

Cloud Processing

Figure 9:
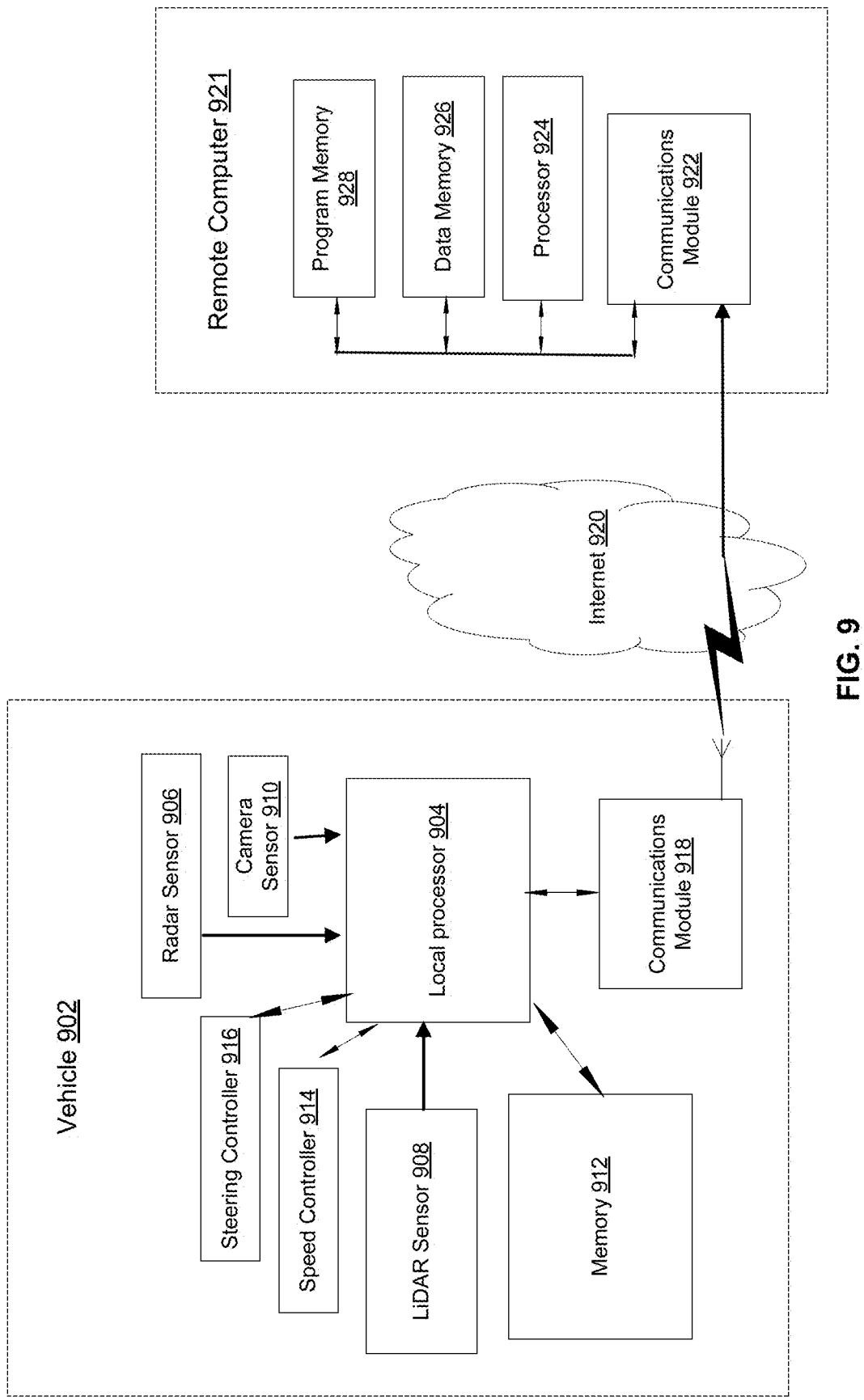
FIG. 9 is block diagram illustrating the division of processing between the vehicle processor and the cloud, according to embodiments.

FIG. 9 is block diagram illustrating the division of processing between the vehicle processor and the cloud, according to embodiments. A vehicle 902 has a processor 904 and one or more sensors, such as a radar sensor 906, LiDAR sensor 908 and camera sensor 910. Local processor 904 receives the sensor data and calculates the projected and possible path zones, as discussed above. A memory 912, which can be multiple memories, stores the data and software programs. Based on the processor calculations, appropriate control signals are sent to a speed controller 914 and a steering controller 916.

A communications module 918 provides communications over the internet 920 and/or other networks, to a remote computer 921. Remote computer 921 has its own communications module 922, processor 924, data memory 926 and program memory 928. Data memory can store the characteristics of each type of vehicle, including performance data such as the extent to which the type of vehicle stays on track. Additionally, terrain data can be recorded with vehicle experience, to be used in calculating appropriate buffer distances for the projected and possible path zones. The buffer distances can then be downloaded to the vehicle 902 memory 912.

The remote computer can be a server, or can be a farmer's computer used to control the farm equipment. A pre-planned path can be generated and wirelessly transmitted using the communications modules to the vehicle 902. The wireless transmission can be over a mobile phone network, via WiFi, etc.

Computer System

Figure 10:
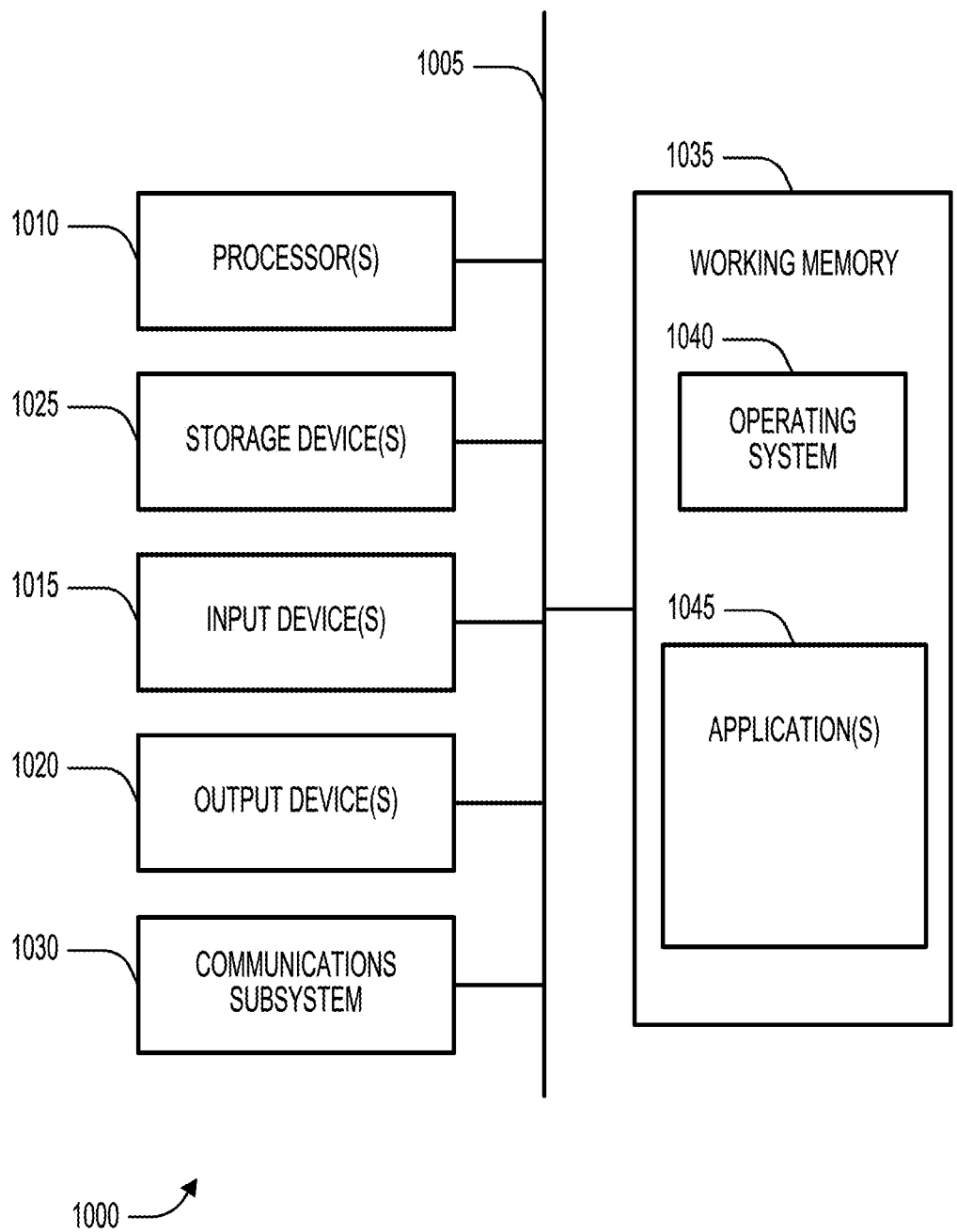
FIG. 10 illustrates a simplified computer system for implementing vehicle collision avoidance controls, according to embodiments.

FIG. 10 illustrates a simplified computer system 1000, in accordance with some embodiments of the present disclosure. FIG. 10 provides a schematic illustration of one embodiment of computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or more integrated manner.

Computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include, without limitation a mouse, a keyboard, a camera, and/or the like; and one or more output devices 1020, which can include, without limitation a display device, a printer, and/or the like.

Computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1000 might also include a communications subsystem 1030, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1030 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1030. In other embodiments, a portable electronic device, e.g., the first electronic device, may be incorporated into computer system 1000, e.g., an electronic device as an input device 1015. In some embodiments, computer system 1000 will further comprise a working memory 1035, which can include a RAM or ROM device, as described above.

Computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1000 and/or might take the form of source and/or installable code, which, upon compilation and/or installation on computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1000 to perform methods in accordance with various embodiments of the technology. According to a set of embodiments, some or all of the procedures of such methods are performed by computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more
sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for avoiding collisions with obstacles by a vehicle, comprising:
   recording a footprint for the vehicle;
   recording stopping times as a function of speed for the vehicle;
   determining a current speed of the vehicle;
   determining a projected vehicle curved trajectory;
   determining a projected path zone corresponding to the projected vehicle curved trajectory and the vehicle footprint;
   determining possible path zones on either side of the projected path zone where the vehicle could potentially go with a change in trajectory;
   detecting objects in the projected and possible path zones;
   determining locations of the objects relative to the footprint of the vehicle;
   slowing down or stopping the vehicle if a projected path object is within a stopping distance plus a projected path buffer distance based on the current speed and a corresponding stopping time with the projected vehicle curved trajectory; and
   slowing down the vehicle if a possible path object is within the stopping distance plus a possible path buffer distance based on the current speed and the corresponding stopping time of the vehicle, wherein the possible path buffer distance is smaller than the projected path buffer distance.

2. The method of claim 1 further comprising:
   recording a preplanned path for the vehicle;
   determining a weighted trajectory for the vehicle based on the preplanned path and a current trajectory; and
   adjusting the projected path zone to reflect the weighted trajectory.

3. The method of claim 2 further comprising:
   assigning weights to positions of the preplanned path and positions of the current trajectory, wherein for positions closer to the vehicle the current trajectory has a higher weight, and for positions farther from the vehicle the preplanned path positions have a higher weight; and combining the weighted positions for the preplanned path and the current trajectory to provide a weighted trajectory.

4. The method of claim 1 further comprising:
recording a three-dimensional geometry of the vehicle;
determining a height of, or clearance under, an object;
comparing the height of, or clearance under, the object to the three-dimensional geometry of the vehicle plus a clearance buffer; and
limiting the slowing of the vehicle if the comparing shows that the vehicle will pass over or under the object without a collision.

5. The method of claim 1 wherein detecting objects and determining locations of the objects is performed using at least one sensor from the group of radar, lidar and camera sensors.

6. The method of claim 1 further comprising:
determining an X, Y location of an object;
determining the projected and possible path zones using a radius and angle of a current curved trajectory of the vehicle; and
converting the X, Y location of the object into radius and angle polar coordinates.

7. The method of claim 1 further comprising:
detecting movement of an object;
determining a trajectory of the moving object;
calculating a projected future location of the moving object; and
determining whether the projected future location is within the projected or possible path zone.

8. The method of claim 1 wherein the projected and possible trajectory paths are defined by arcs about a center of a circle corresponding to the arc of the projected vehicle curved trajectory.

9. A non-transitory computer-readable medium having stored thereon instructions that, when executed by one or more processors, cause the one or more processors to perform operations for avoiding collisions with obstacles by a vehicle, including:
recording, in a memory, a footprint for the vehicle;
recording, in the memory, stopping times as a function of speed for the vehicle;
determining, by the one or more processors, a current speed of the vehicle;
determining, by the one or more processors, a projected vehicle curved trajectory;
determining, by the one or more processors, a projected path zone corresponding to the projected vehicle curved trajectory and the vehicle footprint;
determining, by the one or more processors, possible path zones on either side of the projected path zone where the vehicle could potentially go with a change in trajectory;
detecting, by one or more sensors, objects in the projected and possible path zones;
determining, by the one or more processors, locations of the objects relative to the footprint of the vehicle;
providing control signals, by the one or more processors, to slow down or stop the vehicle if a projected path object is within a stopping distance plus a projected path buffer distance based on the current speed and a corresponding stopping time with the projected vehicle curved trajectory; and
providing control signals, by the one or more processors, to slow down the vehicle if a possible path object is within the stopping distance plus a possible path buffer distance based on the current speed and the corresponding stopping time of the vehicle, wherein the possible path buffer distance is smaller than the projected path buffer distance.

10. The non-transitory computer-readable medium of claim 9 further comprising instructions stored thereon that, when executed by one or more processors, cause the one or more processors to perform operations including:
recording a preplanned path for the vehicle;
determining a weighted trajectory for the vehicle based on the preplanned path and a current trajectory; and
adjusting the projected path zone to reflect the weighted trajectory.

11. The non-transitory computer-readable medium of claim 10 further comprising instructions stored thereon that, when executed by one or more processors, cause the one or more processors to perform operations including:
assigning weights to positions of the preplanned path and positions of the current trajectory, wherein for positions closer to the vehicle the current trajectory has a higher weight, and for positions farther from the vehicle the preplanned path positions have a higher weight; and
combining the weighted positions for the preplanned path and the current trajectory to provide a weighted trajectory.

12. The non-transitory computer-readable medium of claim 9 further comprising instructions stored thereon that, when executed by one or more processors, cause the one or more processors to perform operations including:
recording a three-dimensional geometry of the vehicle;
determining a height of, or clearance under, an object;
comparing the height of, or clearance under, the object to the three-dimensional geometry of the vehicle plus a clearance buffer; and
limiting the slowing of the vehicle if the comparing shows that the vehicle will pass over or under the object without a collision.

13. The non-transitory computer-readable medium of claim 9 wherein detecting objects and determining locations of the objects is performed using at least one sensor from the group of radar, lidar and camera sensors.

14. The non-transitory computer-readable medium of claim 9 further comprising instructions stored thereon that, when executed by one or more processors, cause the one or more processors to perform operations including:
determining an X, Y location of an object;
determining the projected and possible path zones using a radius and angle of a current curved trajectory of the vehicle; and
converting the X, Y location of the object into radius and angle polar coordinates.

15. The non-transitory computer-readable medium of claim 9 further comprising instructions stored thereon that, when executed by one or more processors, cause the one or more processors to perform operations including:
detecting movement of an object;
determining a trajectory of the moving object;
calculating a projected future location of the moving object; and
determining whether the projected future location is within the projected or possible path zone.

16. The non-transitory computer-readable medium of claim 9 wherein the projected and possible trajectory paths are defined by arcs about a center of a circle corresponding to the arc of the projected vehicle curved trajectory.

17. A system, comprising:
one or more processors;
a memory;

at least one sensor; and a non-transitory computer-readable medium having stored thereon instructions that, when executed by the processor, cause the processor to perform operations for avoiding collisions with obstacles by a vehicle including:

recording, in the memory, a footprint for the vehicle;

recording, in the memory, stopping times as a function of speed for the vehicle;

determining, by the one or more processors, a current speed of the vehicle;

determining, by the one or more processors, a projected vehicle curved trajectory;

determining, by the one or more processors, a projected path zone corresponding to the projected vehicle curved trajectory and the vehicle footprint;

determining, by the one or more processors, possible path zones on either side of the projected path zone where the vehicle could potentially go with a change in trajectory;

detecting, by the at least one sensor, objects in the projected and possible path zones;

determining, by the one or more processors, locations of the objects relative to the footprint of the vehicle;

providing control signals, by the one or more processors, to slow down or stop the vehicle if a projected path object is within a stopping distance plus a projected path buffer distance based on the current speed and a corresponding stopping time with the projected vehicle curved trajectory; and providing control signals, by the one or more processors, to slow down the vehicle if a possible path object is within the stopping distance plus a possible path buffer distance based on the current speed and the corresponding stopping time of the vehicle, wherein the possible path buffer distance is smaller than the projected path buffer distance.

18. The system of claim 17 wherein the non-transitory computer-readable medium further comprises instructions stored thereon that, when executed by the one or more processors, cause the one or more processors to perform operations including:

recording a preplanned path for the vehicle;

determining a weighted trajectory for the vehicle based on the preplanned path and a current trajectory; and adjusting the projected path zone to reflect the weighted trajectory.

19. The system of claim 18 wherein the non-transitory computer-readable medium further comprises instructions stored thereon that, when executed by the one or more processors, cause the one or more processors to perform operations including:

assigning weights to positions of the preplanned path and positions of the current trajectory, wherein for positions closer to the vehicle the current trajectory has a higher weight, and for positions farther from the vehicle the preplanned path positions have a higher weight; and combining the weighted positions for the preplanned path and the current trajectory to provide a weighted trajectory.

20. The system of claim 17 wherein the non-transitory computer-readable medium further comprises instructions stored thereon that, when executed by the one or more processors, cause the one or more processors to perform operations including:

recording a three-dimensional geometry of the vehicle;

determining a height of, or clearance under, an object;

comparing the height of, or clearance under, the object to the three-dimensional geometry of the vehicle plus a clearance buffer; and limiting the slowing of the vehicle if the comparing shows that the vehicle will pass over or under the object without a collision.

* * * * *